United States Patent [19]
Field

[11] Patent Number: 4,763,271
[45] Date of Patent: Aug. 9, 1988

[54] METHOD AND APPARATUS FOR UPDATING PARAMETER DATA

[75] Inventor: Michael E. Field, Brookfield, Conn.

[73] Assignee: Pitney Bowes Inc., Stamford, Conn.

[21] Appl. No.: 17,006

[22] Filed: Feb. 18, 1987

Related U.S. Application Data

[63] Continuation of Ser. No. 530,932, Sep. 12, 1983, abandoned.

[51] Int. Cl.[4] .......... G06F 15/20
[52] U.S. Cl. .......... 364/466; 364/900
[58] Field of Search ... 364/200 MS File, 900 MS File, 364/464, 466

[56] References Cited

U.S. PATENT DOCUMENTS

| | | | |
|---|---|---|---|
| 4,236,222 | 11/1980 | Loshbough et al. | 364/567 |
| 4,251,874 | 2/1981 | Check, Jr. | 364/900 |
| 4,286,325 | 8/1981 | Dlugos et al. | 364/466 |
| 4,301,507 | 11/1981 | Soderburg et al. | 364/464 |
| 4,420,819 | 12/1983 | Price et al. | 364/900 |
| 4,498,142 | 2/1985 | Advani et al. | 364/900 |
| 4,558,413 | 12/1985 | Schmidt et al. | 364/300 |

OTHER PUBLICATIONS

BYTE Magazine, Jul. 1981, M. Kelly, "Percom's Doubler," pp. 344, 346, 348, 350-352.

*Primary Examiner*—Gareth D. Shaw
*Assistant Examiner*—Jonathan C. Fairbanks
*Attorney, Agent, or Firm*—Robert H. Whisker; Melvin J. Scolnick; David E. Pitchenik

[57] ABSTRACT

A microprocessor based mailing system, wherein postal rate charts are provided on portable media such as floppy disks, having the capability to update such postal rate charts. The mailing system includes a microcomputer system made up of a microprocessor, a CRT display, a keyboard, dual disk drives and printer; a scale for determining the weight of items to be mailed, and an optional postal meter. The microprocessor determines the appropriate postage for items to be mailed in accordance with the item's weight, postal information input by an operator and postal rate charts stored on a first disk in one of the disk drives. To update the postal rate charts a second disk may be substituted for the first while the first disk is shifted to the other drive. The second disk contains updating information and an updating program to update the rate charts. Upon initialization of the system the updating program is loaded and executed. After updating the first disk the information on the second disk is destroyed, preferably by copying the updated first disk onto it.

8 Claims, 2 Drawing Sheets

FIG. 1
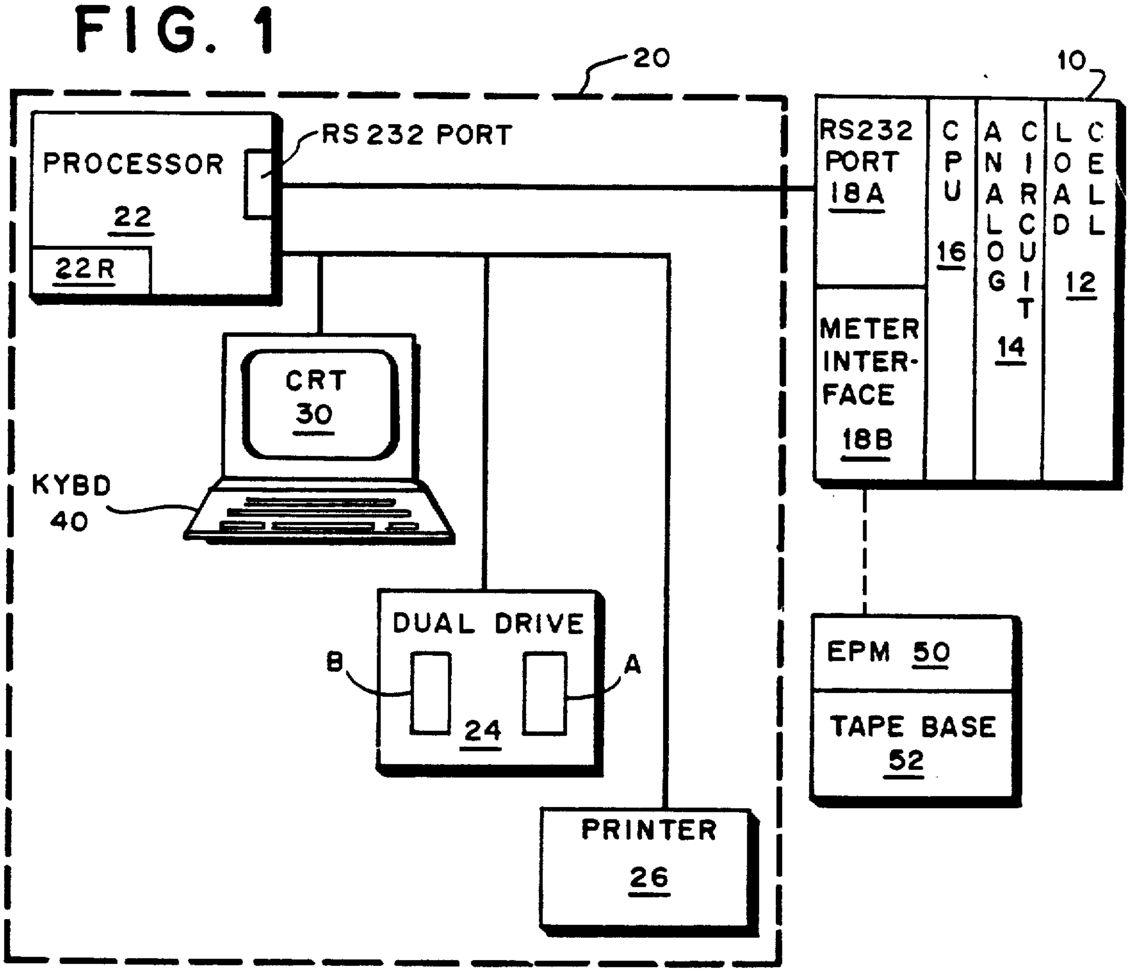
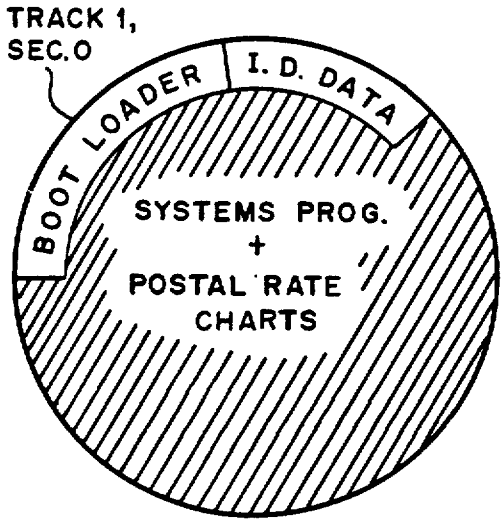
FIG. 2A
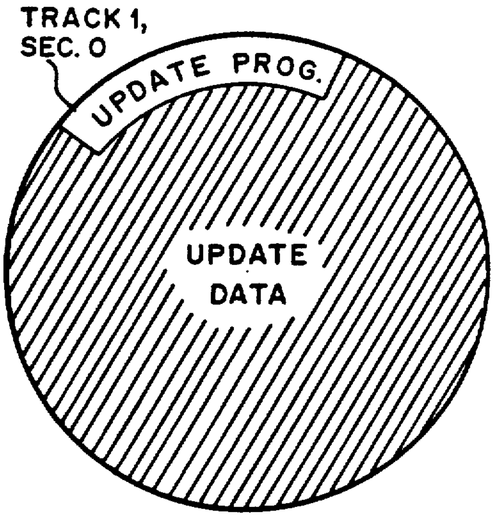
FIG. 2B

METHOD AND APPARATUS FOR UPDATING PARAMETER DATA

This application is a continuation, of application Ser. No. 530,932, filed Sept. 12, 1983, now abandoned.

BACKGROUND OF THE INVENTION

This invention relates to a method and apparatus for updating parameters used in a data processing system. More particularly, this invention relates to a method and apparatus for updating postal rate charts and other postal data in a data processing system which determines applicable postage values for items to be mailed based on the weight of that item and other mailing information.

Mailing systems, in general, are known and a typical such mailing system is described in U.S. Pat. No. 4,286,325 for System and Method for Computing Domestic and International Postage, issued Aug. 25, 1981 to Dlugos, et al. The system disclosed in this reference is dedicated to carrying out the above described postage value computation functions and, though including a number of processors, is not a general purpose data processing system. Because of the dedicated use of the system described in U.S. Pat. No. 4,286,325 it was feasible to include both the system, programs for computing postage values from weights and other postal information relating to items to be mailed, as well as rate charge defining postage rates, in read-only-memory (ROM's) incorporated in such system. Thus, in the system of U.S. Pat. No. 4,286,325 as postage rate charts needed to be updated new ROM's would be distributed by the supplier of the system. Since these ROM's were physically incorporated in the system the problems of improper copying and distribution of postage rate charts was minimized.

Recently it has become desirable to incorporate more computational power into such mailing systems in order to handle additional functions, such as the generation of journals, charge back accounting and the generation of manifests. As the result, recent systems have incorporated more powerful general purpose microprocessors not only to compute applicable postage values but also to handle other functions such as those described immediately above. In mailing systems based on general purpose microprocessors, an effective way to provide systems programs, rate charts and other postal data, such as zip to zone charts has been to use the portable storage media generally provided with such microprocessing systems. Typically this portable storage media might be a floppy disk.

However, when a floppy disk is used for storing systems programs and postal data, problems arise in distributing updating information, since floppy disk's may be readily reproduced using the general purpose processor and associated drives incorporated in the mailing system, reducing the suppliers control over the distribution of such material. Another problem arises from the fact that users who do not make use of a particular postal service desire that the rate charts for services not used not be included in their system, so as to avoid inadvertent mistakes by mailing room personnel using the wrong service. As a result, numerous variations of rate charts are to be found in the field with different mailing systems and the supplier of the mailing system must keep tract of these variations when updating the postal rate charts. This imposes a considerable inventory burden on the supplier.

Thus, it is an object of the subject invention to provide a method and apparatus for updating parameter information, such a rate charts, on data processing system portable media.

It is a further object of the subject invention to provide such a method and apparatus in a manner which reduces cost and decreases inventory control problems.

It is still a further object of the subject invention to provide such a method and apparatus whereby the supplier of a mailing system will be able to control the distribution of such updating information.

BRIEF SUMMARY OF THE INVENTION

The above objects are achieved and the disadvantages of the prior art are overcome by means of a data processing system which comprises: a processor, the processor having a memory for storing programs to be executed by the processor, a mass storage means for storing data, the data including selected parameters to be used in the execution of programs and additional data identifying the selected parameters, a portable media storage means for storing data on portable media such as floppy disks, the portable media data including data for updating the parameters and a program for controlling the updating, means for transferring data between the mass storage means and the memory and for transferring data between the portable media storage means and the memory, initializing means for controlling the transfer of the updating program from the portable media in response to an initialization signal, and wherein the processor then executes the updating program to access the additional data and to identify the selected parameters and then updates the selected parameters in accordance with the updating data.

In another embodiment the subject invention comprises a data processing system comprising: a processor, a memory operatively associated with the processor for storing programs to be executed, a first portable media drive for providing access to portable media and a second portable media drive for providing access to portable media, initializing apparatus for, in response to an initializing signal, controlling the transfer of program data from a predetermined location on a portable medium mounted in the first drive to predetermined locations in the memory and for transferring control of the processor to the program defined by the program data, a first portable medium for storing data the first medium including a boot-up program in the predetermined locations, an operating program and selected parameter data to be used in the execution of the operating program and also additional data identifying the selected parameter data; whereby the system may be operated in a normal mode to execute the operating program in accordance with the parameter data by mounting the first medium in the first drive and generating an initializing signal, and a second portable medium for storing data the second medium including data for updating the selected parameter data and further including data defining an updating program for controlling the updating of the selected parameter data when the first medium is mounted in the second drive, the updating program being stored in the predetermined locations (or, equivalently, including a boot-up program in the predetermined locations); whereby the system may be operated in an updating mode to update the selected parameter data by mounting the first medium in the second drive and mounting the second medium in the first drive and generating an initializing signal.

The subject invention also includes a portable storage medium storing data as patterns of indicia in selected locations within the structure of the medium for use in a data processing system to update data stored in a similar storage medium, the similar medium additionally storing data in predetermined locations defining a program to be loaded into, and executed by the data processing system upon initialization of the data processing system when the portable storage medium is operatively associated with the data processing system, the portable storage medium including, a first pattern of indicia representing data for updating the parameter data, and a second pattern of indicia, stored in locations corresponding to the predetermined locations in the similar storage medium, the second pattern defining an updating program for updating the parameter data in accordance with the updating data, whereby the portable storage medium may be substituted for the similar medium so that the updating program may be loaded into, and extended by, the data processing system upon initialization of the data processing system and the data processing system may update the parameter information in accordance with the updating data when the similar medium is operatively associated with the data processing system.

In a preferred embodiment of the subject invention the data processing system further includes a scale and the operating program computes postage values in accordance with weight of items to be mailed as determined by the scale and in accordance with the parameter information which, comprises postal data charts.

In other preferred embodiments of the subject invention the updating program destroys the updating data on the second portable media after updating the parameter information so as to prevent unauthorized distribution of the updating information.

Thus, it can be seen that the above described subject invention provides an advantageous method and apparatus for updating parameter information in a data processing system wherein the full capabilities of the microprocessor comprised in such system are utilized and unauthorized further distribution of such updating data is prevented.

Other objects and advantages of the subject invention will be readily apparent to those skilled in the art from a consideration of the detailed description set forth below and the attached drawings.

BRIEF DESCRIPTION OF THE DRAWINGS

FIG. 1 shows a schematic block diagram of a mailing system in accordance with the subject invention.

FIGS. 2*a* and 2*b* show floppy disk portable storage media in accordance with the subject invention.

DETAILED DESCRIPTION OF PREFERRED EMBODIMENTS OF THE INVENTION

Figure 3:
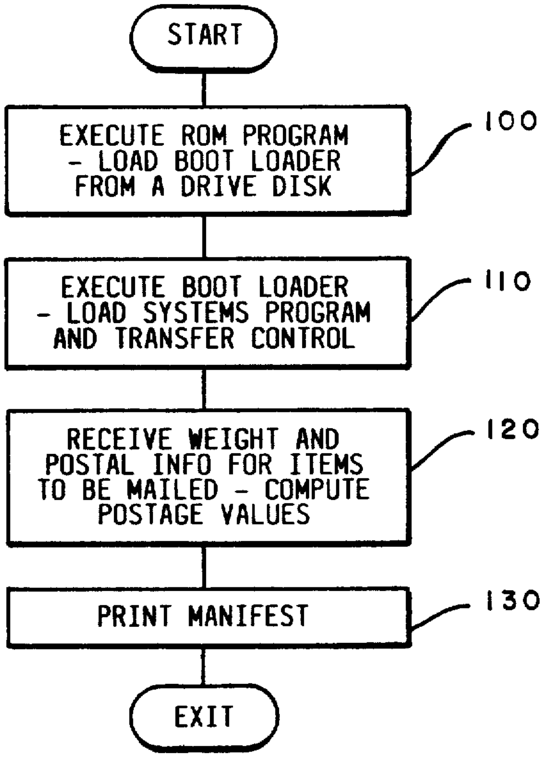
FIG. 3 shows a flow chart of a normal mode of operation of the subject invention.

FIG. 1 shows a schematic block diagram of a mailing system in accordance with the subject invention. The system comprises scale 10, microcomputer system 20 and, optionally, postage meter 50, meter 50 also including tape base 52. Preferably, meter 50 is a model 6500 electronic postage meter produced by Pitney Bowes Inc. of Stamford, Conn. 06926.

Scale 10 comprises a conventional load cell 12 which produces an analog signal proportional to the load on the cell, conventional analog circuitry 14 which senses, amplifies and digitizes the analog signal to produce a periodic digital signal representative of the analog signal, and CPU 16 which receives the digital signal and processes it to determine the weight of the item to be mailed. Construction of such a processor controlled digital scale is well understood in the art and need not be discussed further here for an understanding of the subject invention. A typical example of a similar digital processor controlled scale is shown in U.S. Pat. No. 4,236,222 to Loshbough, et al., issued Nov. 25, 1980.

Microcomputer system 20 comprises microcomputer 22 operatively connected to dual floppy disk drive 24, printer 26, display CRT 30 and keyboard 40. Microcomputer system 20 is substantially similar to any number of commercially available microcomputer systems such as the Altos Microcomputer System produced by the Altos Corporation of San Jose, Calif. Preferably, computer system 20 will have a modified keyboard 40 including special function keys defining various postal information, such as class of service or special rates. A typical set of such special function keys is taught in U.S. Pat. No. 4,286,325 to Dlugos, et al., issued Aug. 25, 1981.

Microcomputer 22 is operatively connected to scale 10 through RS 232 port 18A. RS 232 port 18A provides a standard serial interconnection protocol well known and understood by those skilled in the art and a description of the interconnection process is not necessary for an understanding of the subject invention. If used, electronic postage meter 50 is operatively connected to scale 10 through meter interface 18B. Because operation of postage meter 50 is equivalent to spending money to buy a stamp, interface 18B is specially designed to be secure and have a low error rate. Such an interface is described in U.S. Pat. No. 4,301,507 to Soderberg, et al., issued Nov. 17, 1981, which is hereby incorporated by a reference.

The weight of an item to be mailed is transmitted from CPU 16 through RS 232 port 18A to microcomputer 22. Microcomputer 22 computes the appropriate postage value in accordance with the weight and postal information entered through keyboard 40, as will be described further below. If electronic postage meter 50 is included in the system the appropriate postage value is transmitted back to CPU 16, which in turn transmits the information to postage meter 50 through meter interface 18B as described in the above Soderberg patent. Meter 50 functions conventionally to print appropriate indicia on a meter tape for application to the item to be mailed and to record and account for the postage expended. Alternatively, the appropriate postage value may be printed by printer 26 in conjunction with item identification information to generate a manifest which may be used by a commerical delivery service such as UPS. For simplicity the description of the operation of the mailing system of the subject invention given below will be in terms of a manifest system for use with commerical delivery system such as UPS.

In the normal mode of operation a floppy disk such as that shown in FIG. 2*a* is mounted in drive A of dual disk drive 24. Referring to FIG. 3, at 100 in response to an initialization, or power-up signal microcomputer 22 executes a brief program stored in a ROM 22B which is an integral part of microprocessor 22 to load a boot loader program stored in a predetermined location of the disk of FIG. 2*a* in a conventional manner, well known to those skilled in the art. At 110 the boot loader program then loads the system program stored on the disk of FIG. 2*a* into the memory of microcomputer 22 and transfers control to the systems program. At 120 the systems program operates on weight data for items to be mailed received from scale 10 and other postal information, such as destination and class of service, received from an operator through keyboard 40 to compute appropriate postage values in accordance with postal data charts stored on the disk of FIG. 2*a*. In a preferred embodiment the systems program will display prompts on CRT 30 to elicit the required information from the operator. At 130, having determined the appropriate postage value for items to be mailed, microcomputer 22 prints out the appropriate values in conjunction with information identifying the item to be mailed on the manifest sheet in printer 26. The invoice sheet can then be used to determine the total amount to be paid to the UPS driver when a shipment is picked up and as the invoice for that shipment.

Methods for computation of postage valves are known and are described in U.S. Pat. No. 4,286,325 to Dlugos, et al., which is hereby incorporated by reference.

In preferred embodiment of the subject invention drive B of dual drive 24 may be used to mount a second floppy disk which may be used to record a daily, or longer, record of transactions.

Figure 4:
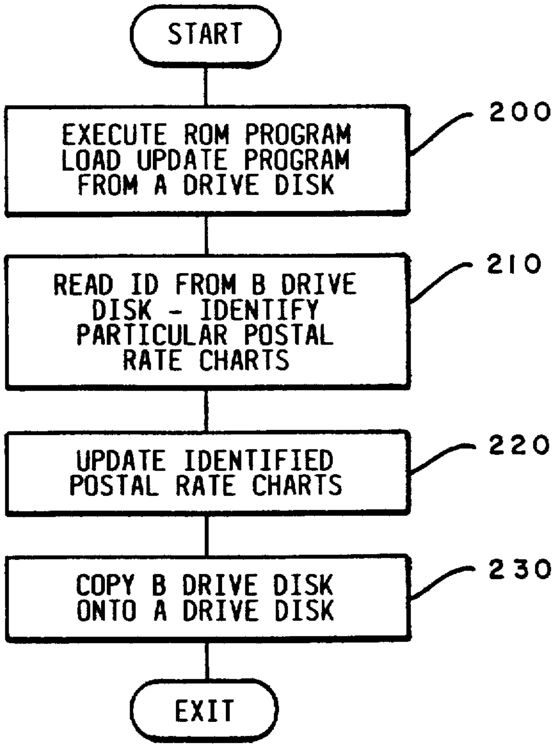
FIG. 4 shows a flow chart of an update mode of the subject invention.

In order to update the postal rate charts of the disk of FIG. 2*a* the system of FIG. 1 may be placed in an update mode by mounting the disk of FIG. 2*b* in drive A and the disk of FIG. 2*a* in drive B. Referring to FIG. 4, at 200 in response to the initialization signal microcomputer 22 would then load the update program, which is stored in locations corresponding to the boot loader on the disk of FIG. 2*a*. (equivalently a boot loader in the corresponding locations on the disk of FIG. 2*b* may be used to load the update program.) At 210 the update program then reads identification data from the disk of FIG. 2*a* which identifies the particular postal rate charts that are available on that disk and are associated with particular postal services used by that system and, at 220, updates those postal rate charts in accordance with the update data on the disk of FIG. 2*b*. After the postal rate charts are updated the program then copies the disk of FIG. 2*a*, in its updated form, back into the disk of FIG. 2*b* thus, simultaneously providing a back-up systems disk, identical to that show in FIG. 2*a*, while destroying the update data to prevent unauthorized reuse of that data.

Preferably the update data may include data defining a check sum which may be used by the update program to validate the data on the systems disk after updating. The updating program would generate a check sum from the updated data on the systems disk in accordance with any of several well known techniques and compare it with the stored check sum. Additionally, the generated check sum could be displayed on CRT 30 for visual verification by an operator.

Those skilled in the art will recognize that the embodiment described above and illustrated in the attached drawings are intended for purposes of illustration only and that the subject invention may be implemented in various ways. Thus, it is to be understood that the embodiments described above are not to be considered as limiting and limitations on the subject invention are to be found only in the attached claims.

What is claimed is:

1. A data processing system comprising:

(a) a processor;

(b) a processor memory operatively associated with said processor for storing programs to be executed;

(c) first portable media drive means operatively associated with said processor for providing access to a portable media;

(d) second portable media drive means operatively associated with said processor for providing access to a portable media;

(e) initializing means for, in response to an initializing signal, controlling the transfer of program data from a predetermined location on a portable medium mounted in said first drive means to predetermined locations in said memory, and for transferring control of said processor to the program defined by said program data;

(f) a first portable medium, said first medium including a boot loader program in said predetermined locations, a system program, and selected parameter data to be used in execution of said system program, whereby said system may be operated in a normal mode to execute said system program in accordance with said parameter data by mounting said first medium in said first drive and generating an initializing signal;

(g) a second portable medium, said second medium including data for updating said selected parameter data and further including data defining an updating program for controlling the updating of said selected parameter data when said first medium is mounted in said second drive, said updating program being loadable by said initializing means, said updating program first updating said selecting parameter data and then, without operator intervention, destroying at least a portion of the data on said second medium so as to render said second medium unusable for updating of other copies of said first medium;

(h) a scale operatively associated with said processor for determining the weight of items to be mailed;

(i) means for entry by an operator of postal information, said postal information including information defining a selected class of service for said items; and wherein (j) said selected parameter data comprises a plurality of postal rate charts; and, (k) said system program computes the appropriate postage values for said items to be mailed in accordance with said weight of said items, said additional information, and one of said postal rate charts corresponding to said selected class of service.

2. A data processing system as described in claim 1 wherein:

(a) said selected parameter data consists of a subset of a set of parameter data;

(b) said first portable medium further includes identification data identifying said subset;

(c) said second medium includes data for updating all of said set of parameter data, said updating program updating said selected parameter data in accordance with said identification data.

3. A data processing system as described in claim 1 wherein said updating program renders said second medium unusable for updating of other copies of said first medium after updating of said selected parameter data by copying said first medium onto said second medium, whereby said updating program and said updating data are destroyed and an updated back-up copy of said first medium is simultaneously created.

4. A data processing system as described in claim 2 wherein said updating program renders said second medium unusable for updating of other copies of said first medium after updating of said selected parameter data by copying said first medium onto said second medium, whereby said updating program and said updating data are destroyed and an updated back-up copy of said first medium is simultaneously created.

5. A portable storage medium for storing data as patterns of indicia in selected locations within the structure of said medium, said stored data being used by a data processing system to update selected parameter data stored in a similar storage medium, said similar storage medium further storing data defining a system program for execution by said data processing system in accordance with said selected parameter data, said portable storage medium comprising:

(a) a first pattern of indicia representing data for updating said selected parameter data;

(b) a second pattern of indicia defining an updating program stored in said portable storage medium in locations predetermined so that said second pattern will be loaded into said data processing system and control transferred to said defined updating program upon initialization of said data processing system when operatively associated with said portable storage medium, said updating program then controlling said data processing system to update said selected parameter data in accordance with said data defined by said first pattern, and then to destroy at least a portion of the data on said portable storage medium so as to render said portable storage medium unusable for updating other copies of said similar storage medium; wherein, (c) said selected parameter data comprises a plurality of postal rate charts; and, (d) said system program controls said data processing system to compute the appropriate postage values for items to be mailed in accordance with the weight of said items, additional postage information defining a selected class of service for said item, and one of said postal rate charts corresponding to said selected class of service.

6. A portable storage medium as described in claim 5 wherein:

(a) said selected parameter data consists of a subset of a set of parameter data;

(b) said similar storage medium further includes identification data identifying said subset;

(c) said portable storage medium includes data for updating all of said set of parameter data, said updating program controlling said data processing system to update said selected parameter data in accordance with said identification data.

7. A portable storage medium as described in claim 5 wherein said updating program renders said portable storage medium unuseable for updating other copies of said similar storage medium after updating of said selected parameter data by copying said similar storage medium onto said portable storage medium, whereby said updating program and said updating data are destroyed and an updated back-up copy of said similar storage medium is simultaneously created.

8. A portable storage medium as described in claim 6 wherein said updating program renders said portable storage medium unusable for updating other copies of said similar storage medium after updating of said selected parameter data by copying said similar storage medium onto said portable storage medium, whereby said updating program and said updating data are destroyed and an updated back-up copy of said similar storage medium is simultaneously created.

* * * * *